US012709824B2

(12) United States Patent
Xie et al.

(10) Patent No.: US 12,709,824 B2
(45) Date of Patent: Aug. 18, 2026

(54) THREE-DIMENSIONAL WOVEN FABRIC FOR A COMPOSITE COMPONENT

(71) Applicant: General Electric Company, Schenectady, NY (US)

(72) Inventors: Ming Xie, Dayton, OH (US); Aaron M. Gilbert, West Newbury, MA (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/673,894

(22) Filed: May 24, 2024

(65) Prior Publication Data

US 2025/0361658 A1 Nov. 27, 2025

(51) Int. Cl.
*F01D 5/14* (2006.01)
*D03D 15/275* (2021.01)
(Continued)

(52) U.S. Cl.
CPC ......... *D03D 25/005* (2013.01); *D03D 15/275* (2021.01); *D03D 15/573* (2021.01);
(Continued)

(58) Field of Classification Search
CPC . F01D 5/147; F01D 5/28; F01D 5/282; F05D 2220/323; F05D 2240/303;
(Continued)

(56) References Cited

U.S. PATENT DOCUMENTS 5,104,726 A * 4/1992 Ross .................... D03D 1/0052 139/408
5,456,974 A * 10/1995 Lundblad ............... D03D 11/00 139/408
(Continued)

FOREIGN PATENT DOCUMENTS

FR 2953225 A1 6/2011
GB 1260484 A 1/1972
(Continued)

OTHER PUBLICATIONS

Coupe et al. WO_2006136755_Machine Translation (Year: 2006).*

*Primary Examiner* — Nathaniel E Wiehe
*Assistant Examiner* — Ayne A Lambert
(74) *Attorney, Agent, or Firm* — Venable LLP; David D. Leege; Michele V. Frank

(57) ABSTRACT

A three-dimensional woven fabric for a composite component and methods of manufacturing such a fabric. The woven fabric has a first region, and a second region and a plurality of reinforcing fiber tows woven together in a three-dimensional pattern such that the woven fabric has a warp direction, a weft direction, and a thickness direction. The reinforcing fiber tows include a plurality of warp fiber tows and a plurality of weft fiber tows. At least a portion of the plurality of reinforcing fiber tows provided in the first region includes bulk fiber tows having a first toughness. At least a portion of the plurality of reinforcing fiber tows provided in the second region includes tough fiber tows having a second toughness. The second toughness of the tough fiber tows is greater than the first toughness of the bulk fiber tows.

20 Claims, 6 Drawing Sheets

(51) Int. Cl.
*D03D 15/573* (2021.01)
*D03D 15/60* (2021.01)
*D03D 25/00* (2006.01)

(52) U.S. Cl.
CPC ............. *D03D 15/60* (2021.01); *F01D 5/147* (2013.01); *D10B 2403/033* (2013.01); *F05D 2220/323* (2013.01); *F05D 2240/303* (2013.01); *F05D 2300/6012* (2013.01); *F05D 2300/603* (2013.01)

(58) Field of Classification Search
CPC ...... F05D 2300/6012; F05D 2300/603; D03D 25/005; D03D 15/275; D03D 15/573; D03D 15/60; D03D 15/267; D03D 15/283; D10B 2403/033
See application file for complete search history.

(56) References Cited

U.S. PATENT DOCUMENTS

| | | | | |
|---|---|---|---|---|
| 5,899,241 | A * | 5/1999 | David | D03D 25/005 139/408 |
| 6,137,083 | A | 10/2000 | Bost et al. | |
| 7,857,588 | B2 | 12/2010 | Propheter-Hinckley et al. | |
| 8,123,167 | B2 | 2/2012 | Olmi et al. | |
| 8,153,539 | B2 * | 4/2012 | Coupe | B29C 70/24 442/205 |
| 8,342,805 | B2 | 1/2013 | Mendez Hernandez et al. | |
| 8,685,868 | B2 * | 4/2014 | Bouillon | F16C 7/026 442/205 |
| 10,406,761 | B2 * | 9/2019 | Foresto | F04D 29/684 |
| 2006/0275132 | A1 * | 12/2006 | McMillan | B29C 70/865 442/205 |
| 2009/0127392 | A1 | 5/2009 | Gross et al. | |
| 2012/0257983 | A1 * | 10/2012 | Williams | B29D 99/0025 156/324 |
| 2013/0105031 | A1 * | 5/2013 | Dambrine | F04D 29/023 140/3 R |
| 2013/0224035 | A1 * | 8/2013 | Alexander | B29B 11/16 416/230 |
| 2013/0259701 | A1 * | 10/2013 | Dambrine | B22F 3/15 228/176 |
| 2014/0030076 | A1 * | 1/2014 | Nunez | C04B 35/571 29/889.7 |
| 2014/0072443 | A1 * | 3/2014 | Mateo | F01D 5/282 29/889.71 |
| 2017/0254212 | A1 | 9/2017 | Pautard et al. | |
| 2018/0045207 | A1 | 2/2018 | Paquin | |
| 2019/0234420 | A1 * | 8/2019 | Bryant, Jr. | B29D 99/0025 |
| 2020/0109493 | A1 | 4/2020 | Takei | |
| 2021/0372428 | A1 * | 12/2021 | De Gaillard | B29D 99/0025 |
| 2021/0396142 | A1 * | 12/2021 | De Gaillard | F01D 21/045 |
| 2022/0364474 | A1 * | 11/2022 | Salas De Los Rios | B29D 99/0025 |
| 2023/0088650 | A1 | 3/2023 | Gondre et al. | |
| 2023/0113922 | A1 * | 4/2023 | Pouzadoux | F01D 5/147 416/230 |
| 2023/0119475 | A1 | 4/2023 | Notarianni et al. | |

FOREIGN PATENT DOCUMENTS

| | | | | |
|---|---|---|---|---|
| WO | WO-2006136755 | A2 * | 12/2006 | B29C 70/24 |
| WO | 2016030613 | A1 | 3/2016 | |

* cited by examiner

THREE-DIMENSIONAL WOVEN FABRIC FOR A COMPOSITE COMPONENT

GOVERNMENT INTEREST

This invention was made with United States Government support. The United States Government may have certain rights in the invention.

TECHNICAL FIELD

The present disclosure relates to three-dimensional woven fabrics and methods of forming the woven fabrics, particularly, woven fabrics used in composite components for aircraft engines.

BACKGROUND

Turbine engines used in aircraft generally include a fan and a turbo-engine section arranged in flow communication with one another. A combustor is arranged in the turbo-engine to generate combustion gases for driving a turbine in the turbo-engine of the turbine engine, and the turbine may be used to drive the fan. A portion of air flowing into the fan flows through the turbo-engine as core air, and another portion of the air flowing into the fan bypasses the core section and flows through the turbine engine as bypass air. The turbo-engine section may include one or more compressors to compress the core air before the core air flows into the combustor. Composite materials may be used to manufacture various components of the turbine engine, particularly, when the turbine engine is a turbine engine for an aircraft.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

FIG. 5A shows a first weave pattern for weft fiber tows comprising bulk fiber tows. FIG. 5B shows a second weave pattern for the weft fiber tows comprising bulk fiber tows. FIG. 5C shows a third weave pattern for the weft fiber tows comprising bulk fiber tows.

DETAILED DESCRIPTION

Figure 1:
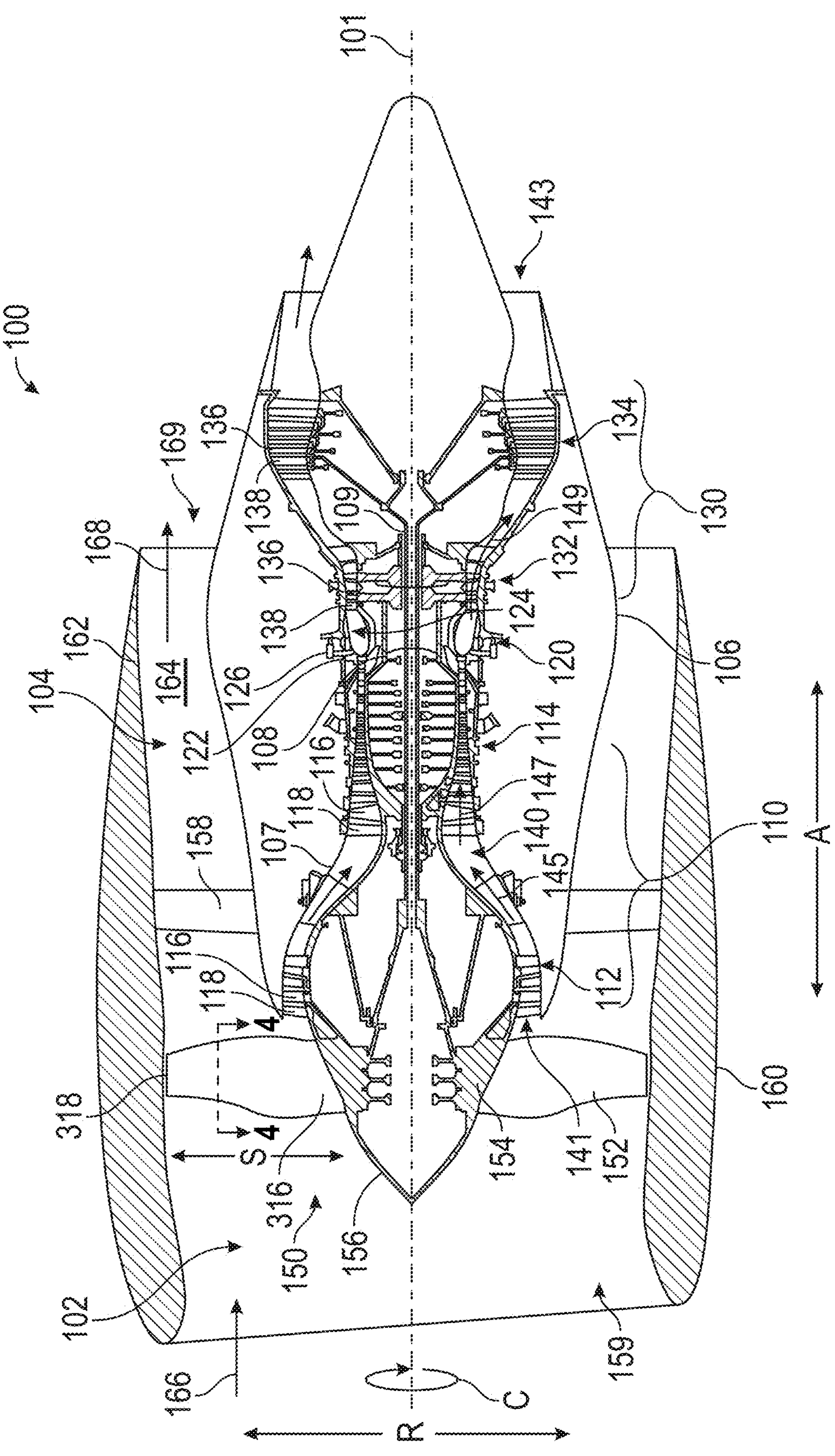
FIG. 1 is a schematic, cross-sectional view of a turbine engine of for an aircraft.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the present disclosure.

As used herein, the terms "first," "second," "third," and the like, may be used interchangeably to distinguish one component from another and are not intended to signify location or importance of the individual components.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

The singular forms "a," "an," and "the" include plural references unless the context clearly dictates otherwise.

Here and throughout the specification and claims, range limitations are combined and interchanged. Such ranges are identified and include all the sub-ranges contained therein unless context or language indicates otherwise. For example, all ranges disclosed herein are inclusive of the endpoints, and the endpoints are independently combinable with each other.

The term "composite," as used herein, is indicative of a material having two or more constituent materials. A composite can be a combination of at least two or more metallic, non-metallic, or a combination of metallic and non-metallic elements or materials. Examples of a composite material can be, but not limited to, a polymer matrix composite (PMC), a ceramic matrix composite (CMC), and a metal matrix composite (MMC). The composite may be formed of a matrix material and a reinforcing element, such as a fiber (referred to herein as a reinforcing fiber).

As used herein "reinforcing fibers" may include, for example, glass fibers, carbon fibers, steel fibers, or para-aramid fibers, such as Kevlar® available from DuPont of Wilmington, Delaware. The reinforcing fibers may be in the form of fiber tows that include a plurality of fibers that are formed into a bundle.

"Preform" as used herein is a piece of three-dimensional woven fabric formed by a plurality of reinforcing fibers including warp fiber tows and weft fiber tows.

As used herein, a "composite component" refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. The adhesive can require curing at elevated temperatures or other hardening techniques.

As used herein, PMC refers to a class of materials. The PMC material may be a prepreg. A prepreg is a reinforcement material (e.g., a reinforcing fiber) pre-impregnated with a polymer matrix material. Non-limiting examples of processes for producing polymeric prepregs include hot melt pre-pregging in which a molten resin is deposited onto the fiber reinforcement material and powder pre-pregging in which a resin is deposited onto the fiber reinforcement material, by way of a non-limiting example, electrostatically, and then adhered to the fiber, by way of a non-limiting example, in an oven or with the assistance of heated rollers.

Resins for matrix materials of PMCs can be generally classified as thermosets or thermoplastics. Thermoplastic resins are generally categorized as polymers that can be repeatedly softened and caused to flow when heated, and hardened when sufficiently cooled due to physical rather than chemical changes. Notable example classes of thermoplastic resins include nylons, thermoplastic polyesters, polyaryletherketones, and polycarbonate resins. Specific examples of high-performance thermoplastic resins that have been contemplated for use in aerospace applications include polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg with thermoplastic polymers, another non-limiting example utilizes a woven fabric. Woven fabrics can include, but are not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and the reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers to a mold or a cavity. The dry fibers can include prepreg, braided material, woven material, or any combination thereof. Resin can be pumped into or otherwise provided to the mold or the cavity to impregnate the dry fibers. The combination of the impregnated fibers and the resin is then cured and removed from the mold. When removed from the mold, the composite component can require post-curing processing. RTM may be a vacuum assisted process. That is, air from the cavity or the mold can be removed and replaced by the resin prior to heating or curing. The placement of the dry fibers also can be manual or automated. The dry fibers can be contoured to shape the composite component or to direct the resin. Optionally, additional layers or reinforcing layers of a material differing from the dry fiber can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to by their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride, SiC/SiC-SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled (e.g., form fiber tows) and/or coated prior to inclusion within the matrix. The bundles of fibers may be impregnated with a slurry composition prior to forming the preform or after formation of the preform. The preform may then undergo thermal processing, and subsequent chemical processing to arrive at a component formed of a CMC material having a desired chemical composition. For example, the preform may undergo a cure or a burn-out to yield a high char residue in the preform, and subsequent melt-infiltration with silicon, or a cure or a pyrolysis to yield a silicon carbide matrix in the preform, and subsequent chemical vapor infiltration with silicon carbide. Additional steps may be taken to improve densification of the preform, either before or after chemical vapor infiltration, by injecting the preform with a liquid resin or a polymer followed by a thermal processing step to fill the voids with silicon carbide. CMC material as used herein may be formed using any known or hereafter developed methods, including but not limited to melt infiltration, chemical vapor infiltration, polymer impregnation pyrolysis (PIP), or any combination thereof.

The term "metallic" as used herein is indicative of a material that includes metal such as, but not limited to, titanium, iron, aluminum, stainless steel, and nickel alloys.

A metallic material or a metal alloy can be a combination of at least two or more elements or materials, where at least one is a metal.

As noted above, certain components of gas turbine engines, particularly, those used in aircraft, may be made from composite materials. Such components include, for example, various airfoils such as fan blades or outlet guide vanes. The reinforcing fiber tows used in these components are preferably high-strength fiber tows, such as carbon fiber tows. Such fiber tows, however, may have limited toughness and thus are prone to brittle fracture upon high impact loading. These components may thus use a combination of fiber tows. One type of fiber tow, referred to herein as a bulk fiber tow, may be the high strength fiber tows used throughout the majority of the composite component, such as carbon fiber. A second type of fiber tow, referred to herein as a tough fiber tow may be selectively used in regions of the component that may be subject to impact loading conditions, such as the leading edges of the airfoils that may be subjected to impacts from foreign objects, like bird ingestion. The tough fiber tows may be, for example, glass fibers having a higher toughness (e.g., a higher elongation, higher failure strain, or both) than the bulk fiber tows. Traditional two-dimensional (2D) layup designs typically used for forming composite gas turbine engine components are challenging to manufacture and may have limited interlaminar strength. Specifically, composite components for gas turbine engines are generally constructed with hand laid plies or by combining multiple woven or prefabricated preforms into one molded part. Hand layup or assembly of preforms increases the labor and costs required to build the component. Assembly of preforms also comes with assembly and positioning challenges. Moreover, a composite component formed from 2D plies or multiple preforms will be more likely to have limited interlaminar loading capability.

The embodiments discussed herein disclose methods of forming a three-dimensional (3D) woven fabric in which the tough fiber tows are integrally woven with the bulk fiber tows. More specifically, as disclosed herein, the tough fiber tows are integrated in a leading-edge area of an airfoil during the weaving and preforming process, instead of secondarily assembling the tough fiber tows as a separate woven fabric with a main woven fabric of the bulk fiber tows of the airfoil body right before cure and co-molding.

The composite materials discussed herein may be particularly suitable for use in turbine engines for aircraft. FIG. 1 is a schematic, cross-sectional view a turbine engine 100 that may be used on an aircraft. The turbine engine 100 has an axial direction A (extending parallel to a longitudinal centerline axis 101, shown for reference in FIG. 1), a radial direction R, and a circumferential direction C. The circumferential direction C extends in a direction rotating about the longitudinal centerline axis 101 (the axial direction A). In the embodiment depicted in FIG. 1, the turbine engine 100 is a high bypass turbofan engine, including a fan section 102 and a turbo-engine 104 disposed downstream from the fan section 102.

The turbo-engine 104 depicted in FIG. 1 includes in serial flow relationship, a compressor section 110, a combustion section 120, and a turbine section 130. The turbo-engine 104 is substantially enclosed within an outer casing 106 that is substantially tubular and defines a core inlet 141. In this embodiment, the core inlet 141 is annular. As schematically shown in FIG. 1, the compressor section 110 includes a booster or a low-pressure (LP) compressor 112 followed downstream by a high-pressure (HP) compressor 114. The combustion section 120 is downstream of the compressor section 110. The turbine section 130 is downstream of the combustion section 120 and includes a high-pressure (HP) turbine 132 followed downstream by a low-pressure (LP) turbine 134. The turbo-engine 104 further includes a core air exhaust nozzle 143 (also referred to as a jet exhaust nozzle) that is downstream of the turbine section 130. The compressor section 110, the combustion section 120, and the turbine section 130 together define, at least in part, a core air flow path 140 extending from the core inlet 141 to the core air exhaust nozzle 143, and through which core air 145 flows. As will be discussed in more detail below, the turbo-engine 104 includes a high-pressure (HP) shaft 108 or a HP spool, and a low-pressure (LP) shaft 109. The HP shaft 108 drivingly connects the HP turbine 132 to the HP compressor 114. The HP turbine 132 and the HP compressor 114 rotate in unison through the HP shaft 108. The LP shaft 109 drivingly connects the LP turbine 134 to the LP compressor 112. The LP turbine 134 and the LP compressor 112 rotate in unison through the LP shaft 109.

Each of the LP compressor 112 and the HP compressor 114 may include a plurality of compressor stages. In each stage, a plurality of compressor blades 116 rotate relative to a corresponding plurality of static compressor vanes 118 (also called nozzles) to compress or to pressurize the core air 145 passing through the stage. In a single compressor stage, the plurality of compressor blades 116 can be provided in a ring, extending radially outwardly relative to the longitudinal centerline axis 101 from a blade platform to a blade tip (e.g., extend in the radial direction R). The compressor blades 116 may be a part of a compressor rotor that includes a disk and the plurality of compressor blades 116 extend radially from the disk. Other configurations of the compressor rotor may be used, including, for example, blisks where the disk and the compressor blades 116 are integrally formed with each other to be a single piece. The corresponding static compressor vanes 118 are positioned upstream of and adjacent to the rotating compressor blades 116. The compressor vanes 118 for a stage of the compressor can be mounted to a core casing 107 in a circumferential arrangement. The core casing 107 may define, at least in part, the core air flow path 140. Each compressor stage may be used to sequentially compress the core air 145 flowing through the core air flow path 140, generating compressed air 147. Any suitable number of compressor blades 116, compressor vanes 118, and compressor stages may be used.

Each of the HP turbine 132 and the LP turbine 134 also may include a plurality of turbine stages. In each stage, a plurality of turbine blades 136 rotate relative to a corresponding plurality of static turbine vanes 138 (also called a nozzle) to extract energy from combustion gases 149 passing through the stage. The turbine blades 136 may be a part of a turbine rotor. Any suitable configuration for a turbine rotor may be used, including, for example, a disk with the plurality of turbine blades 136 extending from the disk. The corresponding static turbine vanes 138 are positioned upstream of and adjacent to the rotating turbine blades 136. The turbine vanes 138 for a stage of the turbine can be mounted to the core casing 107 in a circumferential arrangement.

In the combustion section 120, fuel, received from a fuel system (not shown), is injected into a combustion chamber 124 of a combustor 122 by fuel nozzles 126. The fuel is mixed with the compressed air 147 from the compressor section 110 to form a fuel and air mixture, and combusted, generating combustion products (i.e., combustion gases 149). As will be discussed further below, adjusting a fuel metering unit (not shown) of the fuel system changes the volume of fuel provided to the combustion chamber 124 and, thus, changes the amount of propulsive thrust produced by the turbine engine 100 to propel the aircraft. The combustion gases 149 are discharged from the combustion chamber 124. These combustion gases may be directed into the turbine blades 136 of the HP turbine 132 and, then, the turbine blades 136 of the LP turbine 134, and the combustion gases 149 drive (rotate) the turbine blades 136 of the HP turbine 132 and the LP turbine 134. Any suitable number of turbine blades 136, turbine vanes 138, and turbine stages may be used. After flowing through the turbine section 130, the combustion gases 149 are exhausted from the turbine engine 100 through the core air exhaust nozzle 143 to provide propulsive thrust.

The turbine engine 100 and, more specifically, the turbo-engine 104 further includes one or more drive shafts. As noted above, the turbo-engine 104 includes the high-pressure (HP) shaft 108 drivingly connecting the HP turbine 132 to the HP compressor 114, and the low-pressure (LP) shaft 109 drivingly connecting the LP turbine 134 to the LP compressor 112. More specifically, the turbine rotors of the HP turbine 132 are connected to the HP shaft 108, and the compressor rotors of the HP compressor 114 are connected to the HP shaft 108. The combustion gases 149 are routed into the HP turbine 132 and expanded through the HP turbine 132 where a portion of thermal energy or kinetic energy from the combustion gases 149 is extracted via the one or more stages of the turbine blades 136 and turbine vanes 138 of the HP turbine 132. This causes the HP shaft 108 to rotate, which supports operation of the HP compressor 114 (self-sustaining cycle) and rotating the compressor rotors and, thus, the compressor blades 116 of the HP compressor 114 via the HP shaft 108. In this way, the combustion gases 149 do work on the HP turbine 132. The combustion gases 149 are then routed into the LP turbine 134 and expanded through the LP turbine 134. Here, a second portion of the thermal energy or the kinetic energy is extracted from the combustion gases 149 via one or more stages of the turbine blades 136 and the turbine vanes 138 of the LP turbine 134. This causes the LP shaft 109 to rotate, which supports operation of the LP compressor 112 (self-sustaining cycle), and rotating the compressor rotors and, thus, the compressor blades 116 of the LP compressor 112 via the LP shaft 109. In this way, the combustion gases 149 do work on the LP turbine 134. The HP shaft 108 and the LP shaft 109 are disposed coaxially about the longitudinal centerline axis 101. The HP shaft 108 has a diameter greater than that of the LP shaft 109, and the HP shaft 108 is located radially outward of the LP shaft 109. The HP shaft 108 and the LP shaft 109 are rotatable about the longitudinal centerline axis 101 and, as discussed above, coupled to rotatable elements such as the compressor rotors and the turbine rotors.

The fan section 102 shown in FIG. 1 includes a fan 150 having a plurality of fan blades 152 coupled to a disk 154. The fan blades 152 and the disk 154 are rotatable, together, about the longitudinal centerline (axis) 101 by the LP shaft 109. The LP compressor 112 may also be directly driven by the LP shaft 109, as depicted in FIG. 1. The disk 154 is covered by a fan hub 156 aerodynamically contoured to promote an airflow through the plurality of fan blades 152. Further, a nacelle 160 circumferentially surrounds the fan 150, and in the depicted embodiment, at least a portion of the turbo-engine 104. The nacelle 160 may also be referred to as an annular fan casing or an outer nacelle. The nacelle 160 is supported relative to the turbo-engine 104 and, more specifically, the outer casing 106 by a plurality of outlet guide vanes 158 that are circumferentially spaced about the nacelle 160 and the turbo-engine 104. A downstream section 162 of the nacelle 160 extends over an outer portion of the turbo-engine 104 and, more specifically, the outer casing 106 so as to define a bypass airflow passage 164 therebetween.

During operation of the turbine engine 100, a volume of air 166 enters the turbine engine 100 through an inlet of the nacelle 160 and/or the fan section 102 (referred to herein as an engine inlet 159). As the volume of air 166 passes across the fan blades 152, a first portion of air (bypass air 168) is directed or routed into the bypass airflow passage 164, and a second portion of air (core air 145) is directed or is routed into an upstream section of the core air flow path 140, or, more specifically, into the core inlet 141. The ratio between the bypass air 168 and the core air 145 is commonly known as a bypass ratio. Simultaneously with the flow of the core air 145 through the core air flow path 140 (as discussed above), the bypass air 168 is routed through the bypass airflow passage 164 before being exhausted from a bypass air discharge nozzle 169 of the turbine engine 100, also providing propulsive thrust. The bypass air discharge nozzle 169 and the core air exhaust nozzle 143 are air exhaust nozzles of the turbine engine 100.

The turbine engine 100 shown in FIG. 1 and discussed herein (turbofan engine) is provided by way of example only. In other embodiments, any other suitable engine may be utilized with aspects of the present disclosure. For example, in other embodiments, the engine may be any other suitable gas turbine engine, such as a turboshaft engine, a turboprop engine, a turbojet engine, an unducted single fan engine, and the like. In such a manner, in other embodiments, the gas turbine engine may have other suitable configurations, such as other suitable numbers or arrangements of shafts, compressors, turbines, fans, etc. Further, although the turbine engine 100 is shown as a direct drive, fixed-pitch turbofan engine, in other embodiments, the turbine engine 100 may be a geared turbine engine (e.g., including a gearbox between the fan 150 and a shaft driving the fan, such as the LP shaft 109), may be a variable pitch turbine engine (i.e., including a fan 150 having a plurality of fan blades 152 rotatable about their respective pitch axes), etc. Further, still, in alternative embodiments, aspects of the present disclosure may be incorporated into, or otherwise utilized with, any other type of engine, such as reciprocating engines.

The turbine engine 100 discussed herein is suitable for use on aircraft. Suitable aircraft include, for example, airplanes, helicopters, and unmanned aerial vehicles (UAV). In other embodiments, the turbine engine may be any other turbine engines, such as an industrial turbine engine incorporated into a power generation system, a nautical turbine engine on a ship or other vessel.

Various components of the turbine engine 100 may be formed from composite materials. These components are referred to herein as composite components. The fan blades 152, the outlet guide vanes 158, compressor blades 116, and compressor vanes 118 may be made from PMC materials, for example. Other composites, such as CMC materials, may be used for other components, including, for example, turbine blades 136, turbine vanes 138, and components of the combustion section 120 such as combustor liners used to form the combustion chamber 124. Moreover, although the embodiments are described relative to a turbine engine 100, the composite component and methods of manufacturing may be used to form composite components used in applications beyond turbine engines.

Figure 2A:
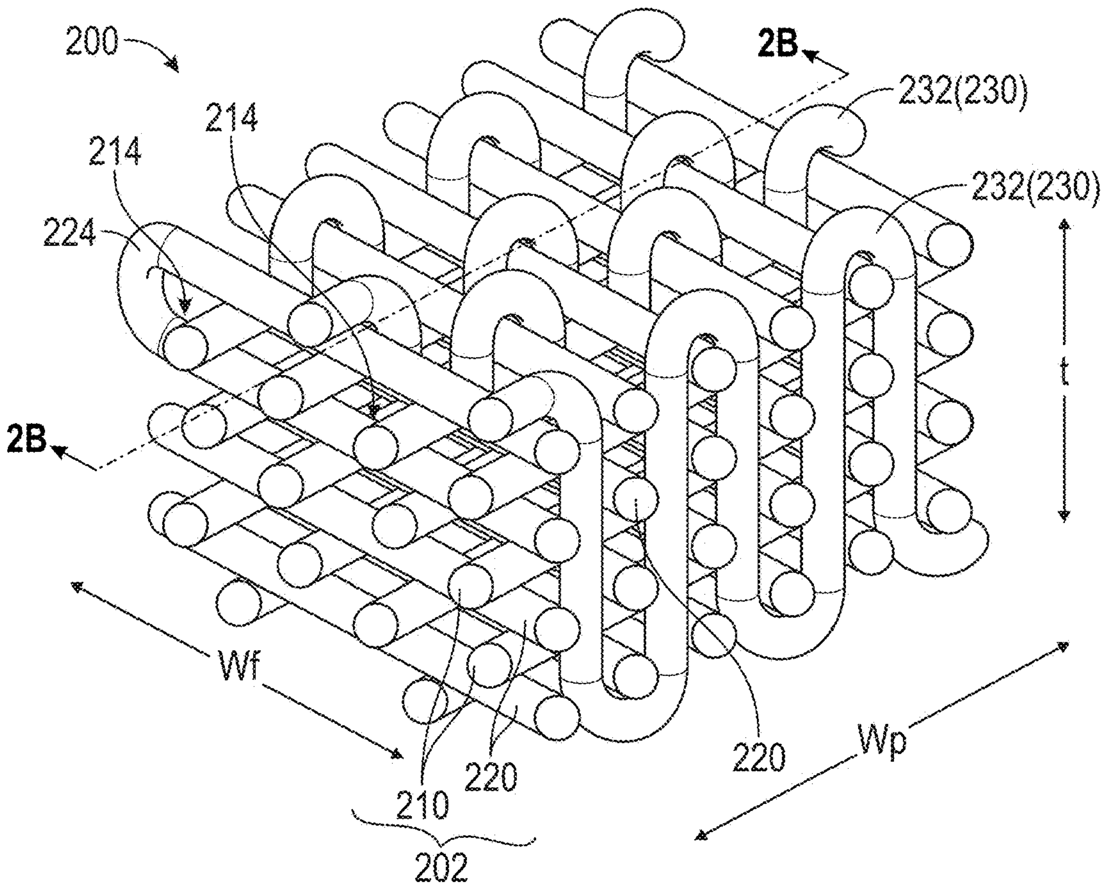
FIG. 2A is a schematic view of a three-dimensional fiber weave pattern.
Figure 2B:
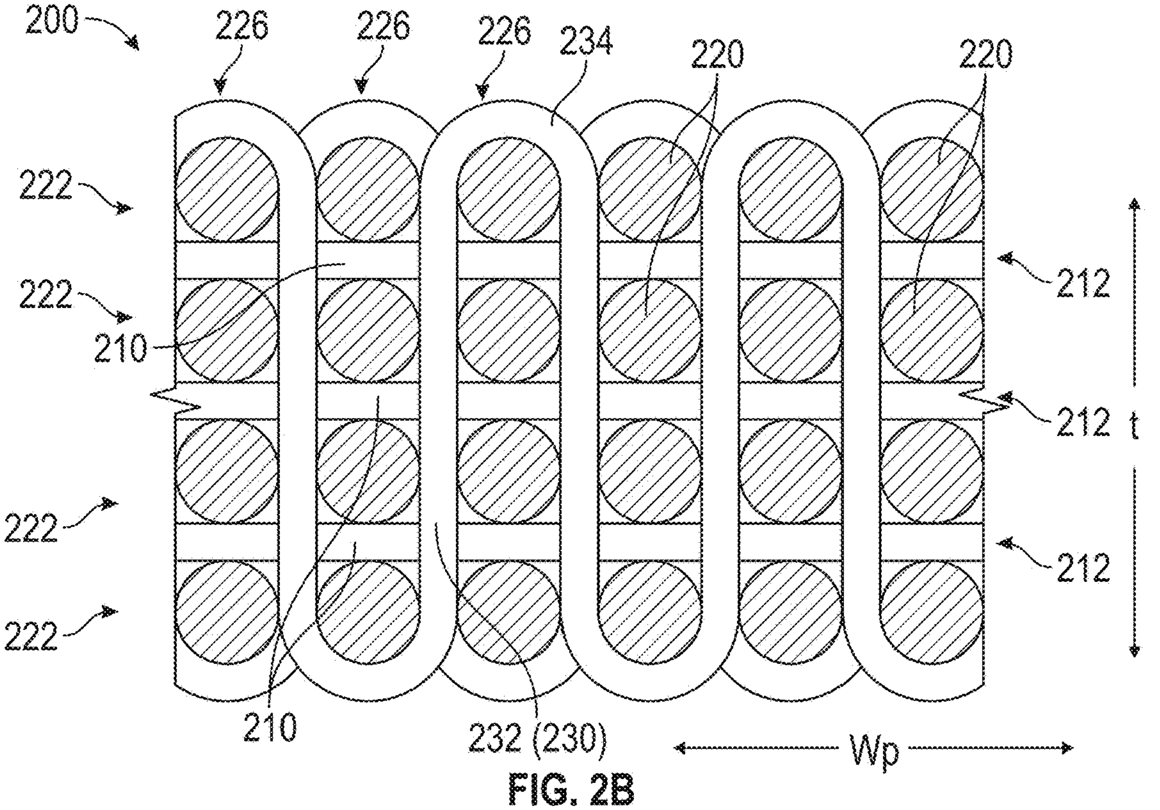
FIG. 2B is a schematic, cross-sectional view of the fiber weave pattern shown in FIG. 2A taken along line 2B-2B in FIG. 2A.

FIGS. 2A and 2B are schematics showing a three-dimensional fiber weave pattern that may be used to form a woven fabric 200. FIG. 2B is a cross-sectional view taken along line B-B in FIG. 2A. In embodiments discussed herein, the composite components may be formed from a plurality of reinforcing fibers and, more specifically a plurality of reinforcing fiber tows 202. The plurality of reinforcing fiber tows 202 are woven together to form the woven fabric 200. The plurality of reinforcing fiber tows 202 includes a plurality of first fiber tows, which in this embodiment is a plurality of warp fiber tows 210. The plurality of reinforcing fiber tows 202 also includes a plurality of second fiber tows, which in this embodiment is a plurality of weft fiber tows 220. The weft fiber tows 220 are oriented transversely to the warp fiber tows 210, and in the depicted embodiment, the warp fiber tows 210 and the weft fiber tows 220 are oriented generally orthogonally to each other. The woven fabric 200 thus includes a warp direction Wp (also referred to as a first direction) and a weft direction Wf (also referred to as a second direction). The warp fiber tows 210 extend in the warp direction Wp and the weft fiber tows 220 extend in the weft direction Wf.

In the depicted embodiment, the woven fabric 200 is a three-dimensional woven fabric and the woven fabric 200 also includes a thickness direction t. The thickness direction may also be referred to as a z direction. The warp fiber tows 210 may be arranged relative to each other to form a plurality of warp fiber layers 212 in the thickness direction t and to form a plurality of warp fiber columns 214 in the weft direction Wf. Three warp fiber layers 212 are depicted in FIGS. 2A and 2B, but the woven fabric 200 may include any other numbers of warp fiber layers 212, including more than three warp fiber layers 212.

During a weaving process, the warp fiber tows 210 may be held in tension in the warp direction Wp, and one of the weft fiber tows 220 is passed or drawn therethrough. A shuttle (not shown) may be used to draw the one of the weft fiber tows 220 through the warp fiber tows 210. The shuttle may be passed through the warp fiber tows 210 in a first direction and then reversed to pass through the warp fiber tows 210 at a different height in the thickness direction forming a plurality of weft fiber layers 222 in the thickness direction t. One of the weft fiber tows 220 may be continuous through at least a portion of the thickness of the woven fabric 200, and the one of the weft fiber tows 220 may include a portion extending in the thickness direction t, which may be referred to in some embodiments as a turnaround. This portion of the weft fiber tow thus may be referred to herein as a turnaround portion 224. The warp fiber tows 210 may be moved relative to each other to allow a space for the one of the weft fiber tows 220 to pass through the space. The warp fiber tows 210 may be moved relative to each other in different ways to create different patterns. In this way, weaving the woven fabric 200 includes positioning the warp fiber tows 210 (e.g., such that the warp fiber tows 210 are held stationary in tension), then laying the weft fiber tows 220 (e.g., such that the weft fiber tows 220 are drawn through and inserted over and under the corresponding warp fiber tows 210), and repeating this process until the woven fabric 200 is formed. The weft fiber tows 220 may be arranged relative to each other to form the plurality of weft fiber layers 222 in the thickness direction t and to form a plurality of weft fiber columns 226 in the warp direction Wp.

The woven fabric 200 also includes a plurality of interlocking fiber tows 230 (also referred to as Z-weaver fiber tows). The interlocking fiber tows 230 are additional warp fiber tows that are directed through the thickness of the woven fabric 200 during weaving to stitch the reinforcing fiber tows 202 together. The interlocking fiber tows 230 are woven to extend between two or more of the weft fiber layers 222. Different fiber patterns may be used for the interlocking fiber tows 230. A first interlocking fiber pattern, shown in FIGS. 2A and 2B, is an orthogonal interlocking pattern and the interlocking fiber tows 230 are referred to herein as orthogonal interlocking fiber tows 232. In this pattern, the orthogonal interlocking fiber tows 232 extend substantially in a direction that is orthogonal to the warp direction Wp, which is the thickness direction t in the depicted embodiment. As with the weft fiber tows 220, the interlocking fiber tows 230 (e.g., the orthogonal interlocking fiber tows 232) may include a turnaround portion 234. In the depicted embodiment, the turnaround portion 234 of the orthogonal interlocking fiber tows 232 is positioned to form an alternating pattern between each warp fiber columns 214. In the depicted embodiment, the orthogonal interlocking fiber tows 232 extend through the thickness of the woven fabric 200 and may be referred to as through-thickness interlocking fiber tows, but other thicknesses may be used.

Figure 2C:
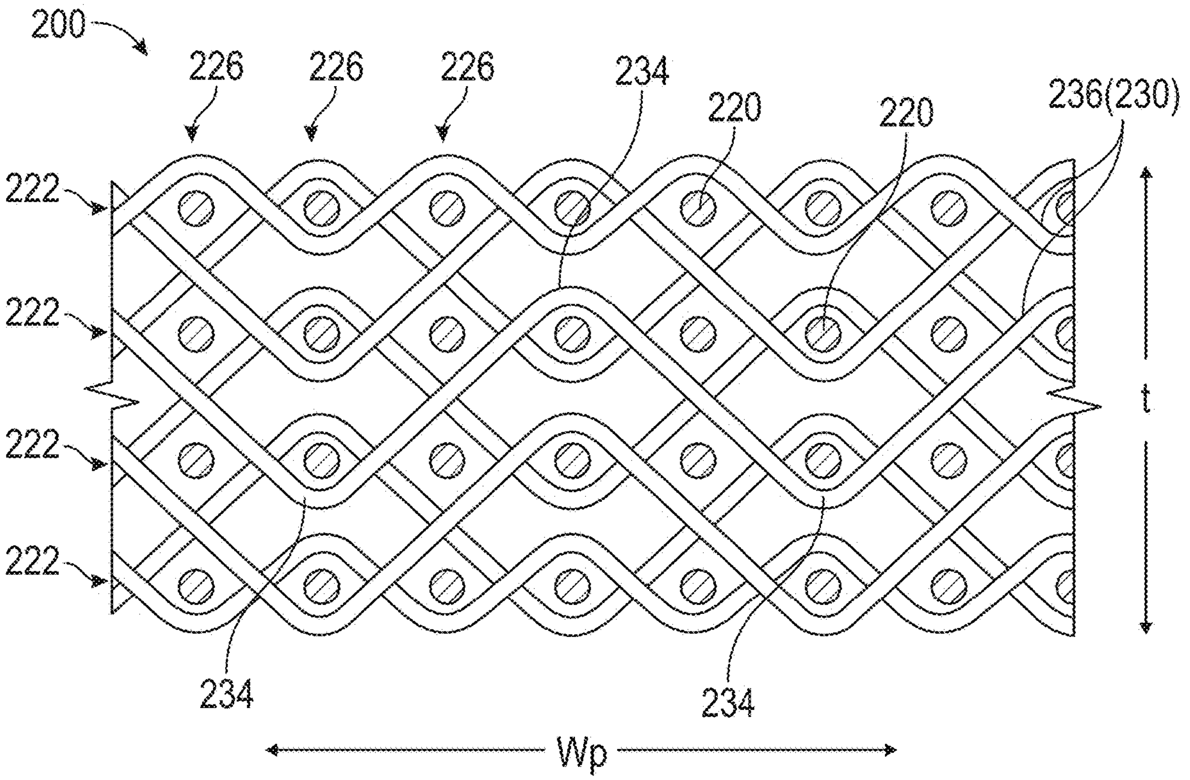
FIG. 2C is a schematic, cross-sectional view of a fiber weave pattern shown similar to the fiber weave pattern shown in FIG. 2A, but with a different interlocking fiber pattern.
Figure 2D:
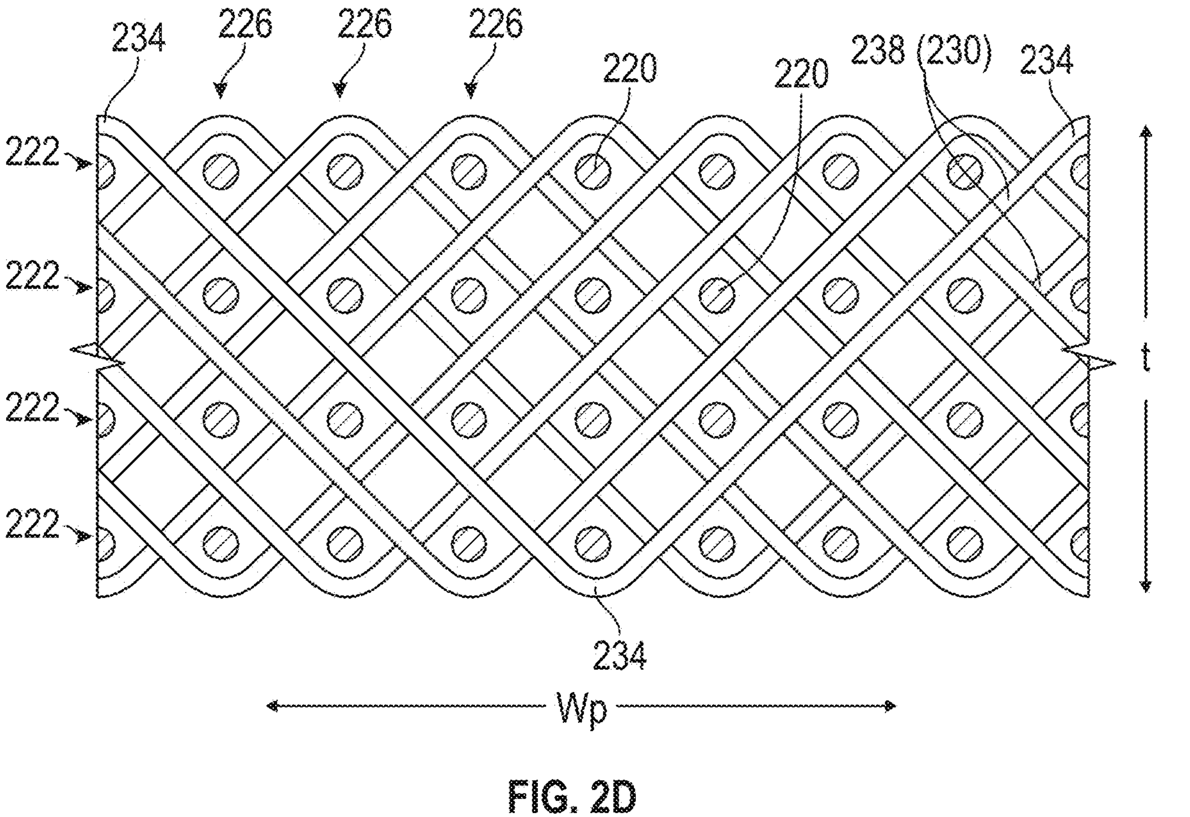
FIG. 2D is a schematic, cross-sectional view of a fiber weave pattern similar to the fiber weave pattern shown in FIG. 2A, but with another interlocking fiber pattern.

A second interlocking fiber pattern, shown in FIG. 2C, is an angle interlock pattern and, more specifically, a layer-to-layer angle interlock pattern. FIG. 2C is a cross-sectional view of a woven fabric taken from a perspective similar to FIG. 2B. The interlocking fiber tows 230 are referred to in this embodiment as angled interlocking fiber tows 236. Instead of extending orthogonally through the woven fabric 200, the angled interlocking fiber tows 236 form an oblique angle relative to the warp direction Wp. In the depicted embodiment, the angled interlocking fiber tows 236 extend through adjacent weft fiber layers 222 in an alternating or a sinusoidal pattern to interlock these adjacent layers with each other, with the oblique angle formed between adjacent turnaround portions 234 of the angled interlocking fiber tows 236. The turnaround portions 234 of the angled interlocking fiber tows 236 are located on every other weft fiber columns 226, but, in other embodiments, two or more weft fiber columns 226 may be between adjacent turnaround portions 234 of the angled interlocking fiber tows 236. In other embodiments, the angled interlocking fiber tows 236 may extend through more than two adjacent weft fiber layers 222. For example, as shown in FIG. 2D, the interlocking fiber tows 230 are through-thickness interlocking fiber tows, which are referred to herein as through-thickness angled interlocking fiber tows 238. FIG. 2D is a cross-sectional view of a woven fabric taken from a perspective similar to FIG. 2B. The warp fiber tows 210 are omitted in FIGS. 2C and 2D for clarity.

Figure 3:
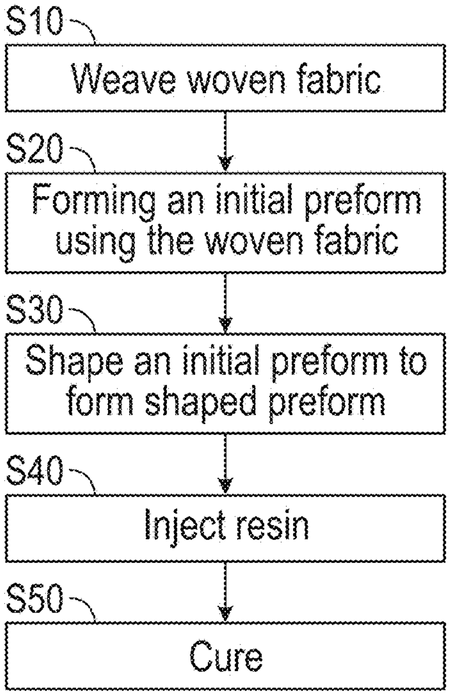
FIG. 3 is a flow chart of a general process for manufacturing a composite component that may be used in the turbine engine of FIG. 1.

FIG. 3 is a flow chart of a general process of manufacturing a composite component that may be used in the turbine engine of FIG. 1. The method includes, in step S10 weaving the woven fabric 200, such as on a loom. In step S20, the method includes forming an initial preform using one or more pieces of woven fabric 200. This step may include, for example, laying up a plurality of woven fabrics 200 or otherwise positioning the plurality of woven fabrics 200 relative to each other to form the initial preform. In step S30, the initial preform is shaped to form a shaped preform. Shaping the initial preform may include, for example, using a mold tool to shape the initial preform. Suitable shaping processes may include vacuum forming or other forming processes to impart a shape to the initial preform. The shaped preform may form a final preform, but optionally, additional machining processes and manufacturing processes, such as adding inserts, may be carried out on the shaped preform to form the final preform.

After the preform is complete (i.e., the final preform), a matrix material may be injected into the preform in step S40 to generate an infiltrated (or an impregnated) preform. When the composite component is a polymer matrix composite, polymers and/or a resin may be pumped into, injected into, or otherwise provided to a mold or a cavity to infiltrate or to impregnate the dry fibers in this step. This step may be done in conjunction with step S30 when using resin transfer molding (RTM) processes, for example. Other infiltration processes may be used in this step depending upon the matrix material. As noted above, the preform may be formed using prepreg fiber tows to introduce a matrix material, and, in such an embodiment, this step (step S40) may be omitted.

The method continues with curing the infiltrated preform in step S50 to bond the composite material and, more specifically, the matrix together forming the composite component. The curing process depends upon the material and may include solidifying or otherwise hardening the matrix material around the fiber tows within the preform. For example, when the matrix material is a polymer, the curing may include both solidifying and chemically crosslinking the polymer chains. Curing the infiltrated preform can include several processes. For instance, an infiltrated preform may be debulked and cured by exposing the infiltrated preform to elevated temperatures and pressures in an autoclave. The infiltrated preform may also be subjected to one or more further processes, such as, e.g., a burn off cycle and a densification process. The curing step S50 may be done in conjunction with step S40, such as when the matrix material is injected into the final preform in a molten state and the curing step includes cooling the matrix material.

Further, the composite component may be finish machined as needed. Finish machining may define the final finished shape or contour of the composite component. For example, when the composite component is a fan blade 152 (FIG. 1), the edges of the fan blade 152 may be machined to define the final shape or the contour of the airfoil. Additionally, the composite component can be coated with one or more suitable coatings, such as, e.g., an environmental barrier coating (EBC) or a polyurethane surface coating.

Figure 4:
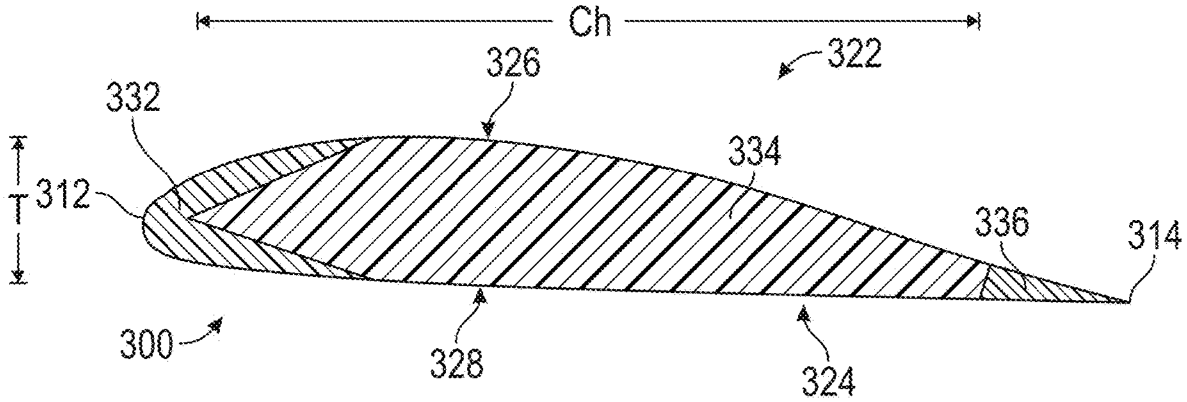
FIG. 4 is a schematic cross-sectional view, taken along line 4-4 in FIG. 1, of an airfoil that may be used in the turbine engine shown in FIG. 1.

FIG. 4 is a schematic cross-sectional view of a composite component that may be used in the turbine engine 100 of FIG. 1. As noted above, various components of the turbine engine 100 may be composite components formed from composite materials, and, in particular, a preform formed of one or more woven fabrics 200 (FIG. 2A). As depicted in FIG. 4, the composite component is an airfoil 300. More specifically, the airfoil 300 shown depicted in FIG. 4 is one of the fan blades 152, and FIG. 4 is a cross-sectional view of the fan blade 152 taken along line 4-4 in FIG. 1. The description of the airfoil 300, however, applies to the other airfoils of the turbine engine 100, including, for example, the outlet guide vanes 158, the compressor blades 116, or the compressor vanes 118.

The airfoil 300 includes a leading edge 312, a trailing edge 314, a root end 316 (FIG. 1), and a tip 318 (FIG. 1). In this example, when the airfoil 300 is the fan blade 152, the airfoil 300 is connected on the root end 316 to a central support, such as the disk 154, about which the airfoil 300 rotates, as shown in FIG. 1. The airfoil 300 extends outwardly in a radial direction from the root end 316 to the tip 318. This direction may also be referred to as the spanwise direction S. Referring back to FIG. 4, the airfoil 300 includes a suction side 322 and a pressure side 324, and surfaces of the airfoil 300 are formed on each of the suction side 322 and the pressure side 324 between the leading edge 312 and the trailing edge 314. These surfaces are a suction surface 326 and a pressure surface 328. As can be seen in FIG. 4, the airfoil 300 is a cambered airfoil with the suction surface 326 having a convex curvature and the pressure surface 328 being generally flat. The airfoil 300 may have any suitable shape, however, including, for example, concave surfaces, and the airfoil 300 may be a symmetric airfoil. The suction surface 326 and the pressure surface 328 are positioned on opposite sides of the airfoil 300 such that, when air flows over the suction surface 326 and the pressure surface 328 of the airfoil 300 as the airfoil 300 rotates about a rotation axis (e.g., the longitudinal centerline axis 101 in FIG. 1), the airfoil 300 generates lift (thrust). The airfoil 300 also includes a chordwise direction Ch, perpendicular to the spanwise direction S (FIG. 1) and extending from the leading edge 312 to the trailing edge 314. A thickness direction T of the airfoil 300 is also perpendicular to each of the spanwise direction S and the chordwise direction Ch.

Figure 5A:
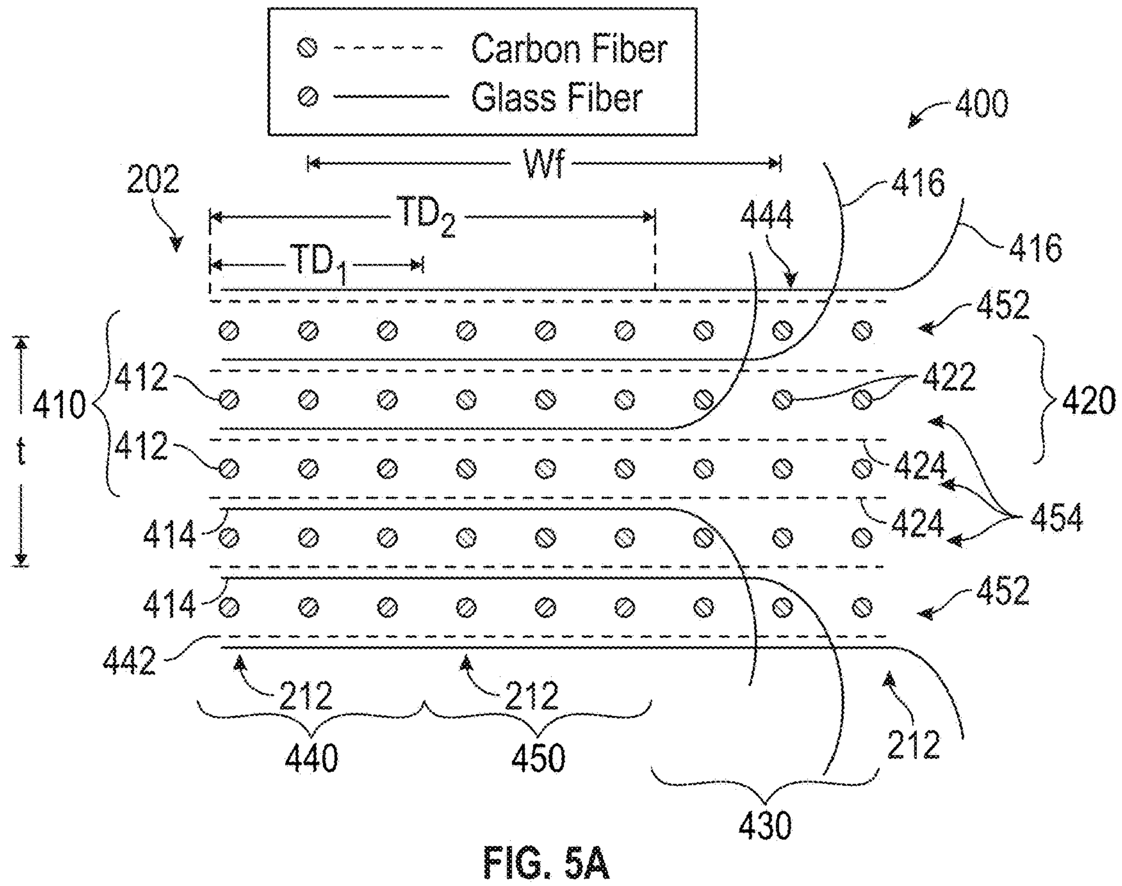
FIGS. 5A to 5C are schematic, cross-sectional views of woven fabrics that may be used to form the composite component shown in FIG. 4.

The airfoil 300 is a composite component comprised of a matrix material formed around the reinforcing fiber tows 202 (FIG. 2A). The composite material may be, for example, a polymer matrix composite (PMC), as discussed above. The reinforcing fiber tows 202 are omitted in FIG. 4 for clarity. In operation, the airfoil 300 may be subjected to impact loads. For example, during a bird ingestion event, the fan blades 152 (airfoils 300) may be subjected to impact. Such impacts may often occur at a leading portion 332 of the airfoil 300 that includes the leading edge 312. The reinforcing fiber tows 202 used in the leading portion 332 can be reinforcing fiber tows 202 that have desirable impact properties, more specifically, such reinforcing fiber tows 202 have a toughness suitable for the design impact loads imparted to the airfoil 300. The reinforcing fiber tows 202 in the leading portion 332 are referred to herein as tough fiber tows 410 (FIG. 5A).

The tough fiber tows 410, like glass fiber tows, may provide good impact resistance, such as higher elongation at failure and higher failure strain, as compared to other materials that may be used for the fibers of the fiber tows (e.g., carbon fiber tows), but this impact resistance may come at the expense of other properties stiffness, strength, and weight (e.g., density). In regions where improved impact resistance is not needed, reinforcing fiber tows 202 with different properties may be used. The airfoil 300 also includes a bulk portion 334 that is the majority of the volume of the airfoil 300. The reinforcing fiber tows 202 in the bulk portion 334, referred to herein as bulk fiber tows 420 are different than those in the leading portion 332.

The airfoil 300 may also include a trailing portion 336. The trailing portion 336 may also be susceptible to impact loads and thus may also include the tough fiber tows 410. The description of the leading portion 332 also applies to the trailing portion 336.

Although discussed in connection with the airfoil 300, the woven fabrics and methods discussed herein may also be applied to other composite components, particularly, those components that may be subject to impact, including the nacelle 160 (FIG. 1), a splitter of the outer casing 106 (FIG. 1) that defines the core inlet 141 (FIG. 1), and the like. In such components, the tough fiber tows 410 may be placed at locations of the composite component susceptible to impact loads, including leading edges or leading portions.

Figure 5B:
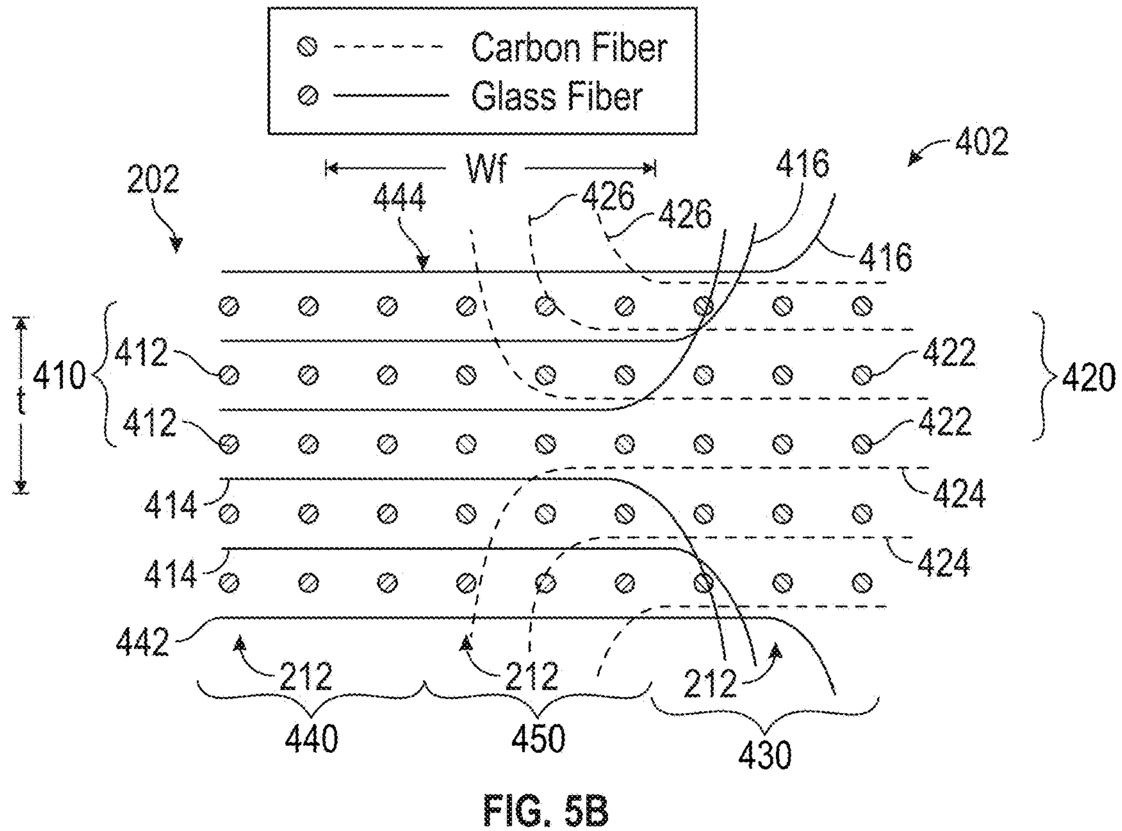
Figure 5C:
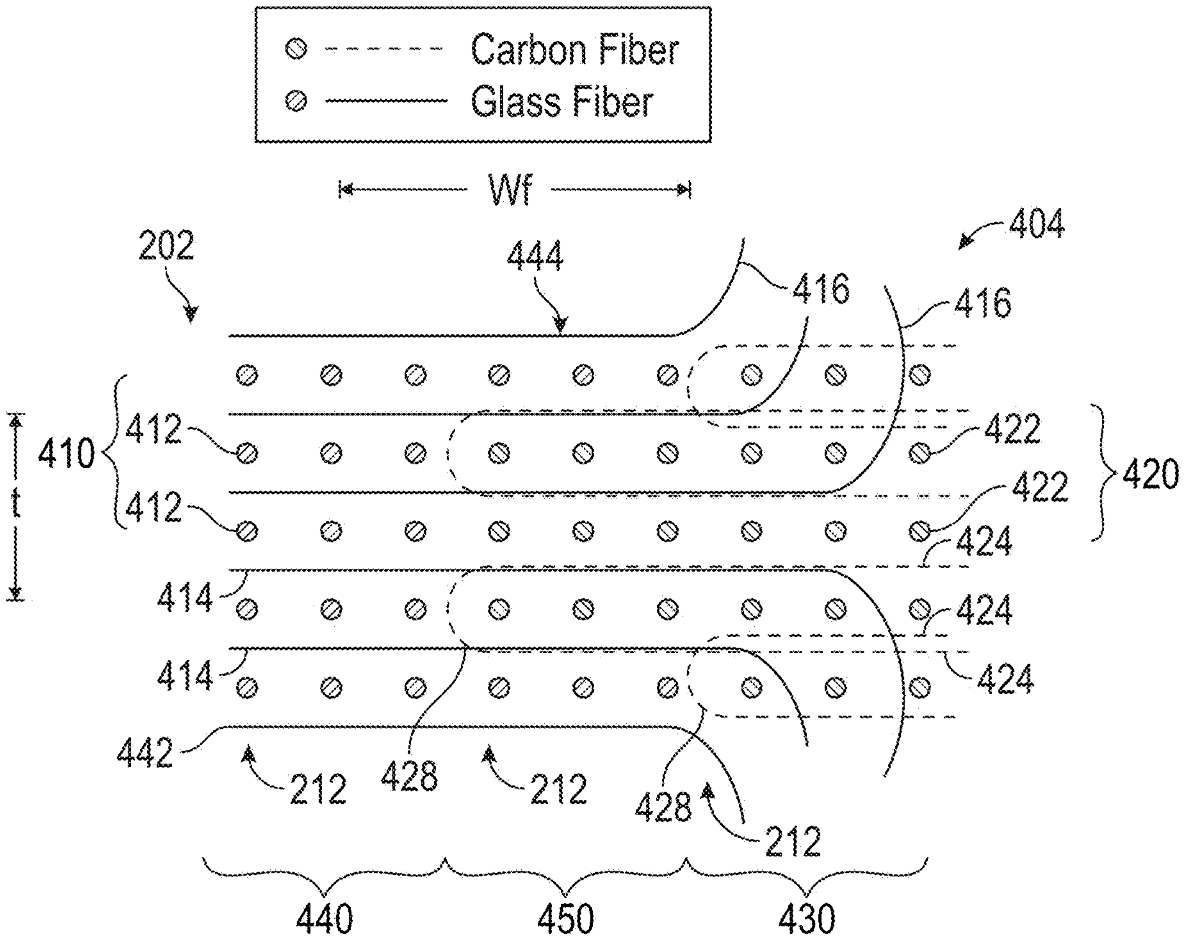

FIGS. 5A to 5C are schematic views of woven fabrics 400, 402, and 404 that may be used to form the composite components discussed herein and, more specifically, the airfoil 300 shown in FIG. 4. The woven fabric 400, 402, 404 shown in FIGS. 5A to 5C, respectively, may be formed similarly to the woven fabric 200 discussed above with reference to FIGS. 2A to 2D, and that discussion applies here. The interlocking fiber tows 230 are omitted from FIGS. 5A to 5C for clarity. Each of FIGS. 5A to 5C illustrates different weave patterns that may be used for the woven fabrics 400, 402, and 404, and the same reference numerals are used for the same or similar components between the weave patterns. The description of one feature in one weave pattern thus applies to the other patterns.

FIG. 5A shows a first weave pattern for a woven fabric 400. One or more woven fabrics 400 may be arranged (e.g., in step S20 of FIG. 3) to form a preform used for the airfoil 300 (FIG. 4). At least one woven fabric 400 is arranged to span between the leading portion 332 (FIG. 4) (or the trailing portion 336 (FIG. 4)) and the bulk portion 334 (FIG. 4). The woven fabric 400 is woven to include both tough fiber tows 410 and bulk fiber tows 420 and, as depicted in FIG. 5A, includes a first region 430, a second region 440, and an interface region 450 between the first region 430 and the second region 440. At least a portion of the plurality of reinforcing fiber tows 202 provided in the first region 430 comprises the bulk fiber tows 420. In the depicted weave pattern, both the warp fiber tows provided in the first region 430 and the weft fiber tows provided in the first region 430 comprise the bulk fiber tows 420 and are referred to herein as warp bulk fiber tows 422 and weft bulk fiber tows 424, respectively. At least a portion of the plurality of reinforcing fiber tows 202 provided in the second region 440 comprises the tough fiber tows 410. In the depicted weave pattern, both the warp fiber tows provided in the second region 440 and the weft fiber tows provided in the second region 440 comprise tough fiber tows 410 and are referred to herein as warp tough fiber tows 412 and weft tough fiber tows 414, respectively. For clarity, only a portion of the tough fiber tows 410 and the bulk fiber tows 420 are labeled in FIGS. 5A to 5C. As discussed further below, however, the tough fiber tows 410 may comprise glass fibers, and the bulk fiber tows 420 may comprise carbon fibers. These fiber tows are schematically depicted differently in FIGS. 5A to 5C as indicated by the legends.

When forming the initial preform (step S20, (FIG. 3) discussed above), the warp direction Wp (FIG. 2A) of the woven fabric 400 may be oriented in the spanwise direction S (FIG. 1) of the airfoil 300 (FIG. 4). Step S20 may thus include arranging the woven fabric 400 and reinforcing fiber tows 202 in the following manner. The warp tough fiber tows 412 and the warp bulk fiber tows 422 may extend and may be oriented in the spanwise direction S. Accordingly, the weft direction Wf (FIG. 2A) of the woven fabric 400 may be generally oriented in the chordwise direction Ch (FIG. 4) of the airfoil 300. The weft tough fiber tows 414 and the weft bulk fiber tows 424 extend and may be oriented in the chordwise direction Ch. The thickness direction t of the woven fabric 400 may also generally correspond to the thickness direction T (FIG. 4) of the airfoil 300.

As noted above, the tough fiber tows 410 are fiber tows that have greater impact resistance than the bulk fiber tows 420. The bulk fiber tows 420 have a first toughness, and the tough fiber tows 410 have a second toughness. The second toughness of the tough fiber tows 410 is greater than the first toughness of the bulk fiber tows 420. The tough fiber tows 410 may have a higher elongation at failure, a higher failure strain, or both than the bulk fiber tows 420. The tough fiber tows 410 may comprise at least one of glass fibers or para-aramid fibers, such as Kevlar® (available from DuPont of Wilmington, Delaware), and the bulk fiber tows 420 may comprise carbon fibers. As noted above, the reinforcing fiber tows 202, such as the tough fiber tows 410 and the bulk fiber tows 420, may include one or more fibers (also referred to as fiber strands). When a plurality of fiber strands is used to form a fiber tow, the fiber strands may be formed into a bundle, and all of the fiber strands in a fiber tow may be made of the same material.

As depicted in FIG. 5A, all of the warp fiber tows provided in the second region 440 are warp tough fiber tows 412, and, likewise, all of the warp fiber tows provided in the first region 430 are warp bulk fiber tows 422. More specifically, each of the warp fiber tows in the warp fiber columns 214 (FIG. 2A) in the second region 440 are warp tough fiber tows 412, and each of the wrap fiber tows in the warp fiber columns 214 in the first region 430 are warp bulk fiber tows 422. With the greater impact resistance of the tough fiber tows 410, the one or more woven fabrics 400 are arranged with the second region 440 positioned to form the leading portion 332 of the airfoil 300 (FIG. 4), and the first region 430 positioned to form the bulk portion 334 (FIG. 4).

To obtain the desired distribution of the tough fiber tows 410 and the bulk fiber tows 420, such as an outer surface layer of a portion of the airfoil 300 having tough fiber tows 410, but an inner portion of the airfoil 300 having bulk fiber tows 420, the woven fabric 400 may also include the interface region 450. In the interface region 450, the warp fiber tows are a mixture of warp tough fiber tows 412 and warp bulk fiber tows 422. More specifically, the warp fiber columns 214 in the interface region 450 include both warp tough fiber tows 412 and warp bulk fiber tows 422. The warp tough fiber tows 412 and the warp bulk fiber tows 422 may be arranged to form outer warp fiber layers 452 and inner warp fiber layers 454. The outer warp fiber layers 452 and the inner warp fiber layers 454 are warp fiber layers 212 (FIG. 2) of the plurality of warp fiber layers 212. The woven fabric 400 may include an edge 442 (which is also an edge of the second region 440 as depicted in FIG. 5A). In each warp fiber layer 212 (FIG. 2A, e.g., outer warp fiber layers 452 and inner warp fiber layers 454), a portion of the warp fiber tows comprises the warp tough fiber tows 412 and a portion of the warp fiber tows comprises the warp bulk fiber tows 422. The warp tough fiber tows 412 are positioned adjacent to each other over a transition distance from the edge 442 to a position in the weft direction Wf where the warp fibers transition to the warp bulk fiber tows 422 positioned adjacent to each other. The transition distance TD may be different between the inner warp fiber layers 454 (a first transition distance TD1) and the outer warp fiber layers 452 (a second transition distance TD2). More specifically, the first transition distance TD1 is less than the second transition distance TD2. These distances are given in the weft direction Wf, and, thus, also correspond to the chordwise direction Ch (FIG. 4) of the airfoil 300 (FIG. 4) and may also be referred to herein as a second region chord distance. The edge 442 may be the leading edge 312 (FIG. 4) of the airfoil 300 (FIG. 4) and thus the transition distances discussed herein can be chord distances and can be taken from the leading edge 312 of the airfoil 300.

The weft fibers in the first region 430 and the second region 440 may also include weft fiber tows that are the weft bulk fiber tows 424 and the weft tough fiber tows 414, respectively. Different arrangements of the weft tough fiber tows 414 and the weft bulk fiber tows 424 may be used. As depicted in FIG. 5A, the weft bulk fiber tows 424 extend from the first region 430, not only into and through the interface region 450, but also into and through the second region 440. In the depicted embodiment, the weft bulk fiber tows 424 extend though the entire woven fabric 400 in the weft direction Wf. The woven fabric 400 may include a width in the weft direction Wf, and the weft bulk fiber tows 424 extend through the entire width of the woven fabric 400. The weft bulk fiber tows 424 may thus also extend the entire length of the chordwise direction Ch (FIG. 4) of the airfoil 300 (FIG. 4), such as to the leading edge 312 (FIG. 4) from the bulk portion 334.

In contrast, the weft tough fiber tows 414 extend through only a portion of woven fabric 400 in the weft direction Wf (e.g., extend through a portion of the width of the woven fabric 400). As with the warp tough fiber tows 412, the weft tough fiber tows 414 may extend different distances (e.g., transition distances) from the edge 442, and then are directed (or float) to a surface 444 of the woven fabric 400. A portion of the weft tough fiber tows 414 extends beyond the surface 444, which is referred to herein as an extra portion 416 of the weft tough fiber tows 414. As part of the post processing operations of the weaving process (step S10 (FIG. 3) above) or forming the preform (step S20 (FIG. 3) above), the extra portion 416 may be trimmed. The weft tough fiber tows 414 may thus also extend only a portion of the chordwise direction Ch (FIG. 4) of the airfoil 300 (FIG. 4). The weft tough fiber tows 414 may terminate in the interface region 450.

Other arrangements of the weft fiber tows and, more specifically, the weft bulk fiber tows 424 may be used. FIGS. 5B and 5C show two of these alternate arrangements. FIG. 5B shows a second weave pattern for a woven fabric 402. In the second weave pattern, the weft bulk fiber tows 424 do not extend the entire weft direction Wf of the woven fabric 402. Instead, the weft bulk fiber tows 424 terminate partway through the woven fabric 402 and, as depicted in FIG. 5B, terminate in the interface region 450. The weft bulk fiber tows 424 extend only through a portion of the weft direction Wf of the woven fabric 402, such as extending through the length of the first region 430 in the weft direction Wf and then extending from the first region 430 into the interface region 450, where the weft bulk fiber tows 424 terminate. The weft bulk fiber tows 424 may terminate a distance (e.g., a transition distance) from the edge 442, and be directed (or float) to a surface 444 of the woven fabric 400. As with the weft bulk fiber tows 424, the transition distance can be different between the weft fibers on outer weft fiber layers than those on inner weft fiber layers. More specifically, the first transition distance (i.e., the distance from the edge 442 to where the weft bulk fiber tows 424 terminate) may be larger for the outer weft fiber layers than the inner weft fiber layers. In FIG. 5B, the weft bulk fiber tows 424 are directed (or float) to the surface 444 of the woven fabric 402 in the interface region 450 and thus include an extra portion 426. As with the extra portion 416 of the weft tough fiber tows 414, the extra portion 426 of the weft bulk fiber tows 424 may be trimmed.

FIG. 5C shows a third weave pattern for a woven fabric 404. The weft bulk fiber tows 424 in FIG. 5C, is similar to the configuration shown in FIG. 5B and discussed above. The weft bulk fiber tows 424 extend though only a portion of the weft direction Wf of the woven fabric 404, but instead of floating to the surface, the weft bulk fiber tows 424 turn around and include a turnaround 428. The turnaround 428 may be located in the interface region 450. Th turnaround 428 can be positioned a distance (e.g., a transition distance) from the edge 442 in the weft direction Wf. greater than the length of the second region 440 in the weft direction Wf. The distance from the edge 442 of each turnaround 428 may be different. For example, the transition distance can be different between the weft fibers on outer weft fiber layers than those on inner weft fiber layers. After the turnaround 428 in the interface region 450, the weft bulk fiber tows 424 can extend back into the first region 430 instead of terminating in the interface region 450. The weft bulk fiber tows 424 can terminate in the first region 430 or be used as a continuous weave (using other turnarounds) to form additional weft fiber layers 222 (see FIG. 2A).

As depicted in FIGS. 5A to 5C, the first region 430, the second region 440, and the interface region 450 extend fully through the thickness direction t of the woven fabric 400 and are regions in the weft direction Wf of the woven fabric 400, but other distributions may be used.

The three-dimensional woven fabrics 400, 402, 404 and discussed herein include both tough fiber tows 410 and bulk fiber tows 420 that can be used to create composite components, such as airfoils 300, with portions that include fibers having improved impact resistance. The integral weaving of the tough fiber tows with the bulk fiber tows provides for improved manufacturing processes to create such composite components.

Further aspects of the present disclosure are provided by the subject matter of the following clauses.

A three-dimensional woven fabric having a first region and a second region comprises a plurality of reinforcing fiber tows woven together in a three-dimensional pattern such that the woven fabric has a warp direction, a weft direction, and a thickness direction, the reinforcing fiber tows including a plurality of warp fiber tows and a plurality of weft fiber tows, the plurality of warp fiber tows being arranged in the thickness direction to form a plurality of warp fiber layers and the plurality of weft fiber tows being arranged in the thickness direction to form a plurality of weft fiber layers, at least a portion of the plurality of reinforcing fiber tows provided in the first region comprising bulk fiber tows having a first toughness, and at least a portion of the plurality of reinforcing fiber tows provided in the second region comprises tough fiber tows having a second toughness, the second toughness of the tough fiber tows being greater than the first toughness of the bulk fiber tows.

The woven fabric of the preceding clause, wherein the bulk fiber tows comprise carbon fibers.

The woven fabric of any preceding clause, wherein the tough fiber tows comprise at least one of glass fibers or para-aramid fibers.

The woven fabric of any preceding clause, wherein each of the tough fiber tows and the bulk fiber tows having an elongation at failure, the elongation at failure of the tough fiber tows being greater than the elongation at failure of the bulk fiber tows.

The woven fabric of any preceding clause, further comprising an edge, in each warp fiber layer of the plurality of warp fiber layers, a portion of the warp fiber tows comprising the tough fiber tows and a portion of the warp fiber tows comprises the bulk fiber tows, the warp fiber tows comprising the tough fiber tows being positioned adjacent to each other over a transition distance from the edge, and the plurality of warp fiber layers including inner warp fiber layers and outer warp fiber layers, the transition distance being different between the inner warp fiber layers and the outer warp fiber layers.

The woven fabric of any preceding clause, wherein the transition distance of the inner warp fiber layers is less than the outer warp fiber layers.

The woven fabric of any preceding clause, wherein the plurality of warp fiber tows provided in the second region comprise the tough fiber tows.

The woven fabric of any preceding clause, wherein the plurality of warp fiber tows provided in the first region comprise the bulk fiber tows.

The woven fabric of any preceding clause, wherein the plurality of weft fiber tows provided in the first region comprise the bulk fiber tows, and the weft fiber tows comprising the bulk fiber tows extend into the second region.

The woven fabric of any preceding clause, wherein the second region including an edge and has a length in the weft direction from the edge, the plurality of weft fiber tows provided in the first region comprise the bulk fiber tows, and the weft fiber tows comprising the bulk fiber tows include a turnaround, the turnaround being positioned a distance from the edge in the weft direction greater than the length of the second region in the weft direction.

The woven fabric of any preceding clause, wherein the woven fabric includes an interface region between the first region and the second region, the plurality of warp fiber tows provided in the interface region includes warp fiber tows comprising the tough fiber tows and warp fiber tows comprising the bulk fiber tows.

The woven fabric of any preceding clause, wherein the plurality of weft fiber tows provided in the first region comprise the bulk fiber tows, and the weft fiber tows comprising the bulk fiber tows terminate in the interface region.

The woven fabric of any preceding clause, wherein at least a portion of the plurality of weft fiber tows provided in the second region comprise the tough fiber tows, and the weft fiber tows comprising the tough fiber tows terminate in the interface region.

The woven fabric of any preceding clause, wherein the plurality of weft fiber tows provided in the first region comprise the bulk fiber tows, and the weft fiber tows comprising the bulk fiber tows include a turnaround, the turnaround being positioned in the interface region.

The woven fabric of any preceding clause, wherein the reinforcing fiber tows further include a plurality of interlocking fiber tows.

The woven fabric of the preceding clause, wherein the plurality of interlocking fiber tows extends in the warp direction.

The woven fabric of the preceding clause, wherein the interlocking fiber tows being woven in an orthogonal interlocking pattern.

The woven fabric of the preceding clause, wherein the orthogonal interlocking pattern extends through the thickness of the woven fabric.

The woven fabric of any preceding clause, wherein the interlocking fiber tows are woven in an angle interlock pattern.

The woven fabric of the preceding clause, wherein the angle interlock pattern extending through adjacent fiber layers in an alternating or a sinusoidal pattern to interlock these adjacent layers with each other.

The woven fabric of any preceding clause, wherein angle interlock pattern extends through more than two adjacent fiber layers.

The woven fabric of the preceding clause, wherein angle interlock pattern extends through the thickness of the woven fabric.

A composite component comprising the woven fabric of any preceding clause, and a matrix formed around the plurality of reinforcing fiber tows of the woven fabric.

The composite component of any preceding clause, wherein the composite component is an airfoil.

The composite component of any preceding clause, the airfoil including a leading edge, in each warp fiber layer of the plurality of warp fiber layers, a portion of the warp fiber tows comprising the tough fiber tows and a portion of the warp fiber tows comprises the bulk fiber tows, the warp fiber tows comprising the tough fiber tows being positioned adjacent to each other over a second region chord distance from the leading edge of the airfoil, and the plurality of warp fiber layers including inner warp fiber layers and outer warp fiber layers, the second region chord distance of the inner warp fiber layers is less than the outer warp fiber layers.

The composite component of any preceding clause, the airfoil including a leading edge, the second region being positioned along the leading edge of the airfoil.

The composite component of any preceding clause, wherein the airfoil includes a trailing edge, the second region being positioned along the trailing edge of the airfoil.

A turbine engine for an aircraft comprising the composite component of any preceding clause.

A turbine engine for an aircraft comprising a fan having fan blades, each of the fan blades comprising the composite component of any preceding clause.

A method of manufacturing a woven fabric having a first region and a second region. The method includes weaving a plurality of reinforcing fiber tows to form the woven fabric, the plurality of reinforcing fiber tows including a plurality of warp fiber tows and a plurality of weft fiber tows, the woven fabric being a three-dimensional woven fabric having a warp direction, a weft direction, and a thickness direction, the plurality of warp fiber tows being arranged in the thickness direction to form a plurality of warp fiber layers and the plurality of weft fiber tows being arranged in the thickness direction to form a plurality of weft fiber layers. At least a portion of the plurality of reinforcing fiber tows provided in the first region comprise bulk fiber tows having a first toughness, and at least a portion of the plurality of reinforcing fiber tows provided in the second region comprise tough fiber tows having a second toughness, the second toughness of the tough fiber tows being greater than the first toughness of the bulk fiber tows.

A method of manufacturing a composite component for a turbine engine. The method includes forming a woven fabric having a first region and a second region, and forming the woven fabric includes weaving a plurality of reinforcing fiber tows to form the woven fabric, the plurality of reinforcing fiber tows including a plurality of warp fiber tows and a plurality of weft fiber tows, the woven fabric being a three-dimensional woven fabric having a warp direction, a weft direction, and a thickness direction, the plurality of warp fiber tows being arranged in the thickness direction to form a plurality of warp fiber layers and the plurality of weft fiber tows being arranged in the thickness direction to form a plurality of weft fiber layers. At least a portion of the plurality of reinforcing fiber tows provided in the first region comprise bulk fiber tows having a first toughness, and at least a portion of the plurality of reinforcing fiber tows provided in the second region comprise tough fiber tows having a second toughness, the second toughness of the tough fiber tows being greater than the first toughness of the bulk fiber tows.

The method of the preceding clause, wherein composite component is an airfoil.

The method of any preceding clause, wherein the bulk fiber tows comprise carbon fibers.

The method of any preceding clause, wherein the tough fiber tows comprise at least one of glass fibers or para-aramid fibers.

The method of any preceding clause, wherein each of the tough fiber tows and the bulk fiber tows have an elongation at failure, the elongation at failure of the tough fiber tows being greater than the elongation at failure of the bulk fiber tows.

The method of any preceding clause, further comprising forming an edge of the woven fabric during weaving of the plurality of reinforcing fiber tows, wherein, in each warp fiber layer of the plurality of warp fiber layers, a portion of the warp fiber tows comprises the tough fiber tows and a portion of the warp fiber tows comprises the bulk fiber tows, the warp fiber tows comprising the tough fiber tows being positioned adjacent to each other over a transition distance from the edge, and wherein the plurality of warp fiber layers includes inner warp fiber layers and outer warp fiber layers, the transition distance being different between the inner warp fiber layers and outer warp fiber layers.

The method of the preceding clause, wherein the transition distance of the inner warp fiber layers is less than the outer warp fiber layers.

The method of any preceding clause, wherein the plurality of warp fiber tows provided in the second region comprise the tough fiber tows.

The method of the preceding clause, wherein the plurality of warp fiber tows provided in the first region comprise the bulk fiber tows.

The method of the preceding clause, wherein the plurality of weft fiber tows provided in the first region comprise the bulk fiber tows, and the weft fiber tows comprising the bulk fiber tows extend into the second region.

The method of any preceding clause, wherein, during weaving of the plurality of reinforcing fiber tows, the plurality of weft fiber tows in the first region comprise the bulk fiber tows, and the weft fiber tows comprising the bulk fiber tows are woven with a turnaround.

The method of the preceding clause, further comprising forming an edge of the second region of the woven fabric during weaving the plurality of reinforcing fiber tows, the second region having a length in the weft direction from the edge, wherein the turnaround is positioned a distance from the edge in the weft direction greater than the length of the second region in the weft direction.

The method of any preceding clause, wherein the woven fabric includes an interface region between the first region and the second region, the plurality of warp fiber tows provided in the interface region includes warp fiber tows comprising the tough fiber tows and warp fiber tows comprising the bulk fiber tows, and wherein the turnaround is positioned in the interface region.

The method of any preceding clause, wherein the woven fabric includes an interface region between the first region and the second region, the plurality of warp fiber tows provided in the interface region includes warp fiber tows comprising the tough fiber tows and warp fiber tows comprising the bulk fiber tows.

The method of the preceding clause, wherein the plurality of weft fiber tows provided in the first region comprises the bulk fiber tows, and the weft fiber tows comprising the bulk fiber tows terminate in the interface region.

The method of the preceding clause, further comprising forming a surface of the woven fabric during weaving of the plurality of reinforcing fiber tows, wherein the weft fiber tows comprising the bulk fiber tows that terminate in the interface region are woven to extend beyond the surface of the woven fabric.

The method of the preceding clause, further comprising trimming the portion of the bulk fiber tows that extend beyond the surface of the woven fabric.

The method of any preceding clause, wherein at least a portion of the plurality of weft fiber tows provided in the second region comprise the tough fiber tows, and the weft fiber tows comprising the tough fiber tows terminate in the interface region.

The method of the preceding clause, further comprising forming a surface of the woven fabric during weaving the plurality of reinforcing fiber tows, wherein the warp fiber tows comprising the tough fiber tows that terminate in the interface region are woven to extend beyond the surface of the woven fabric.

The method of the preceding clause, further comprising trimming the portion of the tough fiber tows that extend beyond the surface of the woven fabric.

The method of any preceding clause, the reinforcing fiber tows further including a plurality of interlocking fiber tows.

The method of the preceding clause, the plurality of interlocking fiber tows extending in the warp direction.

The method of the preceding clause, the interlocking fiber tows being woven in an orthogonal interlocking pattern.

The method of the preceding clause, orthogonal interlocking pattern extending through the thickness of the woven fabric.

The method of any preceding clause, the interlocking fiber tows being woven in an angle interlock pattern.

The method of the preceding clause, angle interlock pattern extending through adjacent fiber layers in an alternating or a sinusoidal pattern to interlock these adjacent layers with each other.

The method of any preceding clause, angle interlock pattern extending through more than two adjacent fiber layers.

The method of the preceding clause, angle interlock pattern extending through the thickness of the woven fabric.

The method of any preceding clause forming the woven fabric of any preceding clause.

A method of forming a composite component. The method includes weaving the woven fabric using the method of any preceding clause, wherein the plurality of reinforcing fiber tows includes prepreg fiber tows to introduce a matrix material, preparing a preform including the woven fabric, and curing the preform including the matrix material to generate the composite component.

A method of forming a composite component. The method includes weaving the woven fabric using the method of any preceding clause, preparing a preform including the woven fabric, injecting a matrix material into the preform to generate an infiltrated preform, and curing the infiltrated preform to generate the composite component.

The method of forming a composite component of any preceding clause, wherein the composite component is the composite component of any preceding clause.

Although the foregoing description is directed to certain embodiments, other variations and modifications will be apparent to those skilled in the art, and may be made without departing from the disclosure. Moreover, features described in connection with one embodiment may be used in conjunction with other embodiments, even if not explicitly stated above.

The invention claimed is:

1. A three-dimensional woven fabric having a first region, a second region, and an interface region between the first region and the second region, the woven fabric comprising:

a plurality of reinforcing fiber tows woven together in a three-dimensional pattern such that the woven fabric has a warp direction, a weft direction, and a thickness direction, the reinforcing fiber tows including a plurality of warp fiber tows and a plurality of weft fiber tows, the plurality of warp fiber tows being arranged in the thickness direction to form a plurality of warp fiber layers and the plurality of weft fiber tows being arranged in the thickness direction to form a plurality of weft fiber layers, the plurality of reinforcing fiber tows including bulk fiber tows having a first toughness and tough fiber tows having a second toughness, the second toughness of the tough fiber tows being greater than the first toughness of the bulk fiber tows, wherein the plurality of warp fiber tows provided in the first region comprises the bulk fiber tows, the plurality of warp fiber tows provided in the second region comprises the tough fiber tows, and the plurality of warp fiber tows provided in the interface region includes warp fiber tows comprising the tough fiber tows and warp fiber tows comprising the bulk fiber tows, and wherein at least a portion of the plurality of weft fiber tows provided in the second region are tough weft fiber tows comprising the tough fiber tows, and the tough weft fiber tows are directed to a surface of the woven fabric and terminate in the interface region.

2. The woven fabric of claim 1, wherein the bulk fiber tows comprise carbon fibers, and wherein the tough fiber tows comprise at least one of glass fibers or para-aramid fibers.

3. The woven fabric of claim 1, further comprising an edge, wherein, in each warp fiber layer of the plurality of warp fiber layers, a portion of the warp fiber tows comprises the tough fiber tows and a portion of the warp fiber tows comprises the bulk fiber tows, the warp fiber tows comprising the tough fiber tows being positioned adjacent to each other over a transition distance from the edge, and wherein the plurality of warp fiber layers includes inner warp fiber layers and outer warp fiber layers, the transition distance being different between the inner warp fiber layers and the outer warp fiber layers.

4. The woven fabric of claim 3, wherein the transition distance of the inner warp fiber layers is less than the outer warp fiber layers.

5. The woven fabric of claim 1, wherein the plurality of weft fiber tows provided in the first region are bulk weft fiber tows comprising the bulk fiber tows, and the bulk weft fiber tows extend into the second region.

6. The woven fabric of claim 1, wherein the plurality of weft fiber tows provided in the first region are bulk weft fiber tows comprising the bulk fiber tows, and the bulk weft fiber tows are directed to a surface of the woven fabric and terminate in the interface region.

7. A three-dimensional woven fabric of claim 1, having a first region, a second region, and an interface region between the first region and the second region, the woven fabric comprising:

a plurality of reinforcing fiber tows woven together in a three-dimensional pattern such that the woven fabric has a warp direction, a weft direction, and a thickness direction, the reinforcing fiber tows including a plurality of warp fiber tows and a plurality of weft fiber tows, the plurality of warp fiber tows being arranged in the thickness direction to form a plurality of warp fiber layers and the plurality of weft fiber tows being arranged in the thickness direction to form a plurality of weft fiber layers, the plurality of reinforcing fiber tows including bulk fiber tows having a first toughness and tough fiber tows having a second toughness, the second toughness of the tough fiber tows being greater than the first toughness of the bulk fiber tows, wherein the plurality of warp fiber tows provided in the first region comprises the bulk fiber tows, the plurality of warp fiber tows provided in the second region comprises the tough fiber tows, and the plurality of warp fiber tows provided in the interface region includes warp fiber tows comprising the tough fiber tows and warp fiber tows comprising the bulk fiber tows, and wherein the plurality of weft fiber tows provided in the first region are bulk weft fiber tows comprising the bulk fiber tows, and the bulk weft fiber tows include a turnaround in the interface region, the bulk weft fiber tows reversing direction at the turnaround and extending back into the first region.

8. A composite component comprising:

the woven fabric of claim 1; and a matrix formed around the plurality of reinforcing fiber tows of the woven fabric.

9. The composite component of claim 8, wherein the composite component is an airfoil.

10. The composite component of claim 9, wherein the airfoil includes a leading edge, wherein, in each warp fiber layer of the plurality of warp fiber layers, a portion of the warp fiber tows comprises the tough fiber tows and a portion of the warp fiber tows comprises the bulk fiber tows, the warp fiber tows comprising the tough fiber tows being positioned adjacent to each other over a second region chord distance from the leading edge of the airfoil, and wherein the plurality of warp fiber layers includes inner warp fiber layers and outer warp fiber layers, and the second region chord distance of the inner warp fiber layers is less than the outer warp fiber layers.

11. The composite component of claim 9, wherein the airfoil includes a leading edge, the second region being positioned along the leading edge of the airfoil.

12. A turbine engine for an aircraft comprising the composite component of claim 11.

13. A turbine engine for an aircraft comprising a fan having fan blades, each of the fan blades comprising the composite component of claim 11.

14. A three-dimensional woven fabric having a first region and a second region, the woven fabric comprising:

a plurality of reinforcing fiber tows woven together in a three-dimensional pattern such that the woven fabric has a warp direction, a weft direction, and a thickness direction, the reinforcing fiber tows including a plurality of warp fiber tows and a plurality of weft fiber tows, the plurality of warp fiber tows being arranged in the thickness direction to form a plurality of warp fiber layers and the plurality of weft fiber tows being arranged in the thickness direction to form a plurality of weft fiber layers, the plurality of reinforcing fiber tows including bulk fiber tows having a first toughness and tough fiber tows having a second toughness, the second toughness of the tough fiber tows being greater than the first toughness of the bulk fiber tows, wherein the plurality of warp fiber tows provided in the first region comprises the bulk fiber tows and the plurality of warp fiber tows provided in the second region comprises the tough fiber tows, and wherein the plurality of weft fiber tows provided in the first region are bulk weft fiber tows comprising the bulk fiber tows, and the bulk weft fiber tows extend into the second region.

15. The woven fabric of claim 14, wherein the bulk fiber tows comprise carbon fibers, and wherein the tough fiber tows comprise at least one of glass fibers or para-aramid fibers.

16. The woven fabric of claim 14, wherein at least a portion of the plurality of weft fiber tows provided in the second region are tough weft fiber tows comprising the tough fiber tows.

17. The woven fabric of claim 16, wherein the woven fabric includes an interface region between the first region and the second region, and the plurality of warp fiber tows provided in the interface region includes warp fiber tows comprising the tough fiber tows and warp fiber tows comprising the bulk fiber tows, and the tough weft fiber tows terminate in the interface region.

18. A composite airfoil comprising:

the woven fabric of claim 14; and a matrix formed around the plurality of reinforcing fiber tows of the woven fabric.

19. The woven fabric of claim 7, wherein the bulk fiber tows comprise carbon fibers, and wherein the tough fiber tows comprise at least one of glass fibers or para-aramid fibers.

20. A composite component comprising:

the woven fabric of claim 7; and a matrix formed around the plurality of reinforcing fiber tows of the woven fabric.

* * * * *